Nov. 19, 1957 E. ALIZON 2,814,003

BINARY NUMERATION PULSE COUNTER

Filed Jan. 12, 1954

INVENTOR:
ETIENNE ALIZON
BY:
Michael S. Striker
agt

United States Patent Office 2,814,003

Patented Nov. 19, 1957

2,814,003

BINARY NUMERATION PULSE COUNTER

Etienne Alizon, La Celle Saint-Cloud, France, assignor to Compagnie Industrielle des Telephones, Paris, France, a corporation of France Application January 12, 1954, Serial No. 403,605

Claims priority, application France January 20, 1953

6 Claims. (Cl. 317—140)

The present invention is relative to pulse counters comprising binary elements which may consist of any device having two conditions or positions of stable equilibrium corresponding respectively to the recording of the digits 0 and 1 of the binary numeration.

A binary counter generally comprises a number of groups numbered from 1 to N, each group being capable of assuming two positions, a rest position, and a working position. The group of the $p$th place is used for marking, according to its working or rest position, the value 1 or the value 0 for the $p$th digit counted from the right, of the number of control pulses to be recorded, written in binary numeration; it thus represents $2^{p-1}$ or 0.

An object of the present invention is a binary numeration pulse counter characterized in that the pulses to be counted are applied in the shape of two series of pulses of different polarities, on a chain of groups of binary elements comprising at least two elements, one of which is set working at the beginning of one pulse and the other one at the end of the same pulse, a second pulse causing them to come back to rest, the first element at the beginning of the pulse and the second one at the end of the pulse.

According to another characteristic of the invention, the binary counter comprises a switching element with two positions, which confers it the property of operating, at will, additively or subtractively by changing the connections between the successive groups of binary elements.

The operation as an additive counter is defined as follows:

The $(p-1)$ first groups of binary elements being working and the $p$th one being at rest, the additive pulse will place the $(p-1)$ first groups at rest and the $p$th one at its working position without changing anything to the groups having a rank higher than $p$: there is actually an addition of $2^{p-1}-(1+ \ldots 2^{p-2})=1$ if $p=1$ the first group is on "rest" and the pulse affects the condition of this only group without changing anything to the others.

The operation as a subtractive counter is defined thus:

The $(p-1)$ first groups being in the rest condition and the $p$th one in the working condition, the pulse changes the conditions of these $p$ groups without changing anything in that of the next ones. There is actually an addition of $(1+ \ldots 2^{p-2})-2^{p-1}=-1$. If $p=1$ the first group only passes from the "working" to the "rest" condition, nothing being changed in the conditions of the others.

Other features of the invention will appear from the following description thereof with reference to the figures of the appended drawing which show, by way of a non limitative example two forms of embodiment of the binary counter according to the invention.

In the following description, the letter R, following the number of a relay contact indicates the contact set up when the relay is at rest (not energized) and the letter T, the contact set up when the relay is working.

Figure 1:
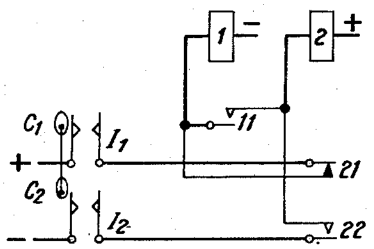
Figure 1 shows, diagrammatically, a group of binary elements.

In Figure 1, a group of binary elements comprises essentially two counting relays 1 and 2, the first one with a set of contacts 11, the second one with two sets of contacts 21, 22. The pulses to be counted act on a device of two cams $C_1$ and $C_2$ connected mechanically and which simultaneously close two switches $I_1$ and $I_2$. The result is that for each pulse to be counted the two switches $I_1$ and $I_2$ supply respectively one positive pulse and one negative pulse.

The operation of the device shown in Figure 1 is as follows:

The group being assumed to be at rest, the arrival of a pulse, by closing the switch $I_1$ will set the relay 1 at "work" due to the connections:

+battery, $I_1$, 21R, winding of 1, —battery

The relay 2, however, is not energized contact 22 being open and due to the positive voltage its second terminal receives through the contact 11 at "work" and the switch $I_1$. It is only at the end of the pulse, characterised by the opening of the contact $I_1$ that as this positive voltage disappears it is energized in series with the relay 1 and comes to "work" so that then both relays remain "at work."

The pulse applied to the contact $I_2$ simultaneously with that applied to $I_1$ was without any effect on relay 2 because the latter remains at rest as long as this pulse lasts, due to contact 22 being open.

When the next pulse arrives, it finds both relays 1 and 2 "at work," with contacts 11 and 22 closed and contact 21 open. Therefore, now the pulse applied to $I_1$ is without effect, while the pulse applied to $I_2$ sets up a circuit —battery, $I_2$, 22T, winding of 2, +battery so that the relay 2 remains "at work," while relay 1 returns to "est" because both ends of its winding are connected to the negative pole of the battery.

As soon as the second pulse ends and both contacts $I_1$ and $I_2$ are simultaneously opened, all circuits are interrupted and relay 2 also returns to "rest." In this manner all conditions are re-established which existed before the first pulse, so that with the third pulse a cycle is started identical with the one described above with respect to the first pulse.

Figure 2:
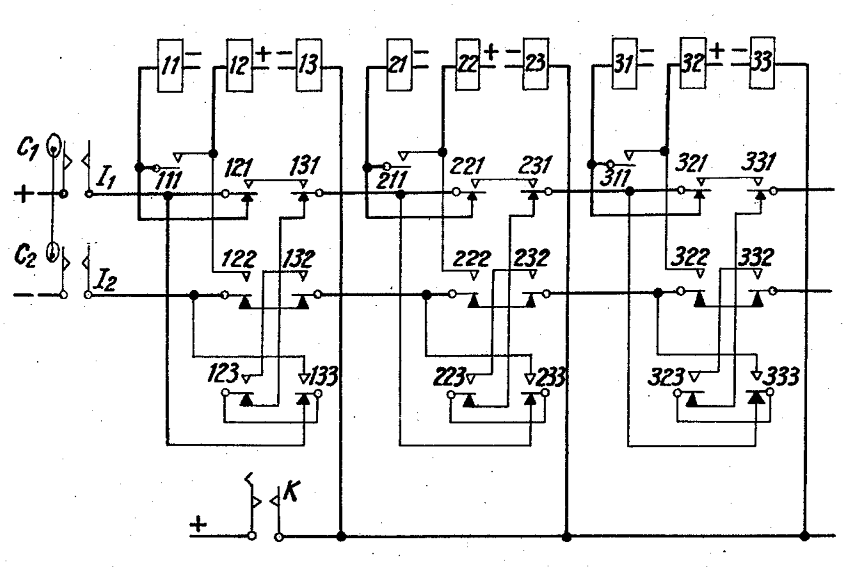
Figure 2 shows the diagram of three groups of elements of a binary counter capable of operating additively or subtractively.

In Figure 2 there is shown a binary counter with three groups of elements capable of operating, at will as additive or subtractive. Each group of elements comprises two counting relays 11 and 12, 21 and 22, 31 and 32 corresponding to relays 1 and 2 in Figure 1. Each group of elements comprises, in addition, a third relay 13, 23, 33, controlled by means of a key K the function of which is to cause the passing from the additive operation of the counter to the subtractive operation. These relays 13, 23, 33 are provided with three sets of contacts 131, 132, 133; 231, 232, 233; 331, 332, 333.

The second relays 12, 22, 32 comprise a third set of contacts 123, 223 and 323 which, combined with the third set of contacts 133, 233, 333, makes it possible to ensure the connection between the successive groups.

In the working positions of the relays 13, 23, 33, with contact K closed, the counter operates additively; this operation as an additive counter is as follows:

The first pulse, by causing the closure of the contacts $I_1$ and $I_2$, places relay 11 on "work" then the end of the pulse places relay 12 on "work" as described above for the relays 1 and 2 in Figure 1.

The second group of relays is not affected since its connecting circuits with the contacts $I_1$ and $I_2$ are cut at 121 and 123 for the duration of the pulse.

The second pulse causes the return to "rest" of relays 11 and 12 of the first group and places at "work" relay 21 of the second group due to the connections:

+battery, $I_1$, 121T, 131T, 221R, winding of 21 —battery and relay 22 is set at "work" at the end of the pulse. During this second pulse, the pulse applied to $I_2$ is not transmitted to the relays of the second group.

The third pulse places the first relay group on "work" and the second group is unaffected.

After the third pulse the two first groups are at "work" and the third one at "rest."

The fourth pulse causes the return to rest of relay 11 through the circuit:

—battery, $I_2$, 122T, 111T, winding of 11, —battery

At the end of the pulse, the relay 12 comes back to rest.

Similarly, the group 2 comes to rest due to the connections

—battery, $I_2$, 133T, 123T, 132T, 222T, 211T, winding of 21 —battery

The third group passes on "work" at the beginning of the pulse the relay 31 is energized through the following circuit:

+battery, $I_1$, 121T, 131T, 221T, 232T, 321T, winding of 31 —battery and the relay 32 is set to "work" at the end of the pulse.

The following groups are unaffected; their connecting circuits with $I_1$ and $I_2$ being cut at 321 and 323 for the duration of the pulse.

The additive operation, therefore, is actually obtained.

In the "rest" positions of relays 13, 23 and 33, with contact K open the subtractive operation is obtained, which is as follows:

If all the binary relay groups are at rest, the arrival of a pulse places all relays on "work."

If the relay groups are taken in the condition in which they are, in the additive operation, after the recording of the fourth pulse, i. e. groups 1 and 2 are at rest and group 3 at work, the arrival of a pulse places the two first groups on "work," relays 11 and 21 at the beginning of the pulse, relays 12 and 22 at the end of the pulse due to the connections:

+battery, $I_1$, 121R, winding of 11, —battery

+battery, $I_1$, 133R, 123R, 131R, 221R, winding of 21, —battery

The third group is set at "rest," relay 31 at the beginning of the pulse through the circuit:

—battery, 122R, 132R, 222R, 232R, 322T, 311T, winding of 31, —battery and the second relay 32 is set at "rest" at the end of the pulse.

The next relays are unaffected, their connecting circuits with $I_1$ and $I_2$ being cut at 321 and 323. Thus a subtractive operation is actually obtained.

The binary counter just described may comprise a large number of element groups, the number of these groups depending on the number of pulses or pulse trains to be recorded; with $p$ groups $2^{p-1}$ pulses or pulse trains may be recorded.

The relays 13, 23, 33 may be replaced by a single relay controlling simultaneously the contacts 131, 132, 133, 231, etc.

It has been assumed that the pulses cause the simultaneous closures of the contacts $I_1$ and $I_2$ by means of two cams connected mechanically, but it should be obvious that the contacts $I_1$ and $I_2$ may be closed simultaneously by any other device, in particular these contacts may be parts of one relay controlled by the pulses to be recorded.

I claim:

1. An impulse counter comprising, in combination, a first relay having a first relay winding and a first relay contact in normally open rest position; a second relay connected in circuit with said first relay and having a second relay winding and a plurality of second relay contacts, at least one of said second relay contacts being in normally open rest position and another of said second relay contacts being in normally closed rest position, one side of said first relay contact being connected to one side of said first relay winding and also to one side of the normally closed second relay contact, one side of said second relay winding being connected to the other side of said first relay contact and also to one side of said normally open second relay contact; means for applying a positive D. C. potential to the other side of said second relay winding; means for applying a negative D. C. potential to the other side of said first relay winding; and means for converting impulses applied to said counter into two simultaneous impulses, one of said simultaneous impulses having a positive polarity and the other having a negative polarity, said positive polarity impulse being applied to the normally closed second relay contact and said negative polarity impulse being simultaneously applied to said open second relay contact, the potentials of said simultaneous impulses being respectively equal to that applied to said relays.

2. An impulse counter comprising, in combination, a plurality of binary element groups, each group including a first relay having a first relay winding and a first relay contact in normally open rest position, a second relay connected in circuit with said first relay and having a second relay winding and a plurality of second relay contacts, at least one of said second relay contacts being in normally open rest position and another of said second relay contacts being in normally closed rest position, one side of said first relay contact being connected to one side of said first relay winding and also to one side of the normally closed second relay contact, one side of said second relay winding being connected to the other side of said first relay contact and also to one side of said normally open second relay contact, means for applying a positive D. C. potential to the other side of said second relay winding, means for applying a negative D. C. potential to the other side of said first relay winding; means for converting impulses applied to said counter into two simultaneous impulses, one of said simultaneous impulses having a positive polarity and the other having a negative polarity, said positive polarity impulse being applied to the normally closed second relay contact in the first binary group, said negative polarity pulse being simultaneously applied to said normally open second relay contact of said first binary element group; and means for electrically connecting together all of the normally open second relay contacts.

3. A pulse counter comprising, in combination, a plurality of binary element groups connected in cascade, each of said groups having at least a first and a second relay which undergo a complete cycle of operation in response to two successive pulses being applied to the particular group, the cycle of operation of each group including the transition from a normal rest position to a work position and back to the normal rest position; means for transforming each of the pulses to be counted into two simultaneous pulses of opposite polarity and applying them to the first of said binary element groups; and means for transmitting said pulses from each of said binary element groups to the next successive binary element group while said second relay is in one of said positions.

4. A pulse counter comprising, in combination, a plurality of binary element groups connected in cascade, each of said groups having at least a first and a second relay which undergo a complete cycle of operation in response to two successive pulses being applied to the particular group, the cycle of operation of each group including the transition from a normal rest position to a work position and back to the normal rest position; means for transforming each of the pulses to be counted into two simultaneous pulses of opposite polarity and applying them to the first of said binary element groups; and means for transmitting said pulses from each of said binary element groups to the next successive binary element group, while said second relay is in one of said positions, said first relay being operated to its work position at the beginning of the first of the transformed pulses and the second relay being operated to its work position at the end of the same transformed pulse, the next transformed pulse of opposite polarity to said first transformed pulse returning said first and second relays to their rest position, said first relay returning to its rest position at the beginning of the next transformed pulse and the second relay returning to its rest position at the end of the next transformed pulse.

5. Apparatus as claimed in claim 4 having a plurality of switching means, each of said switching means being connected respectively between successive binary element groups and having a first and a second position, said switching means in said first position causing the pulse counter to add the pulses applied thereto and in said second position causing the pulse counter to subtract the pulses applied thereto.

6. An impulse counter comprising, in combination, a plurality of binary element groups, each of said groups including at least one first relay having a first relay winding and a first relay contact, at least one second relay connected in circuit with said first relay and having a second relay winding and three second relay double-throw switches, and at least one third relay having a third relay winding and three third relay double-throw switches, each of said double-throw switches comprising two contacts and a relatively movable contact normally engaging the first of said two contacts, one side of said first relay contact being connected to one side of said first relay winding and also to one side of the first contact of the first one of said second relay switches, one side of said second relay winding being connected to the other side of said first relay contact and also to the second contact of the second one of said second relay switches; switching means for converting the performance of said impulse counter from an adding operation to a subtracting operation and vice versa, one side of said switching means being connected to a source of positive D. C. potential, the other side thereof being connected to one side of said third relay winding, a negative D. C. potential being applied to the other side of said first relay winding and to the other side of said third relay winding, a positive polarity D. C. potential being applied to the other side of said second relay winding; means for transforming each of the pulses to be counted into two simultaneous pulses and including at least one first and one second impulse contact, one side of said first impulse contact being connected to a source of positive polarity D. C. potential, and one side of said second impulse contact being connected to a source of negative polarity D. C. potential, the other side of said first impulse contact being connected to the movable contact of said first one of said second relay switches and also to the first contact of the third one of said third relay switches, the first contact of the first one of said third relay switches being connected to the first contact of the third one of said second relay switches and the movable contact of the first one of said third relay switches being connected to the first contact of the third one of the third relay switches of the next following group; the other side of said second impulse contact being connected to the movable contact of the second one of said second relay switches and also to the second contact of the third one of said third relay switches, the first contact of the second one of said third relay switches being connected to the first contact of the second one of said second relay switches and the movable contact of the second one of said third relay switches being connected to the second contact of the third one of the third relay switches of the next following group; a connection between the second contact of the first one of said second relay switches and the second contact of the first one of said third relay switches, a connection between the movable contact of the third one of said second relay switches and the movable contact of the third one of said third relay switches, and a connection between the second contact of the third one of said second relay switches and the second contact of the second one of said third relay switches.

References Cited in the file of this patent

UNITED STATES PATENTS

| | | |
|---|---|---|
| 2,561,073 | Schouter et al. | July 17, 1951 |
| 2,583,102 | Holden | Jan. 22, 1952 |
| 2,584,363 | Mumma | Feb. 5, 1952 |
| 2,616,958 | Westerveld | Nov. 4, 1952 |
| 2,635,197 | Routledge et al. | Apr. 14, 1953 |